May 22, 1956  C. J. KINSEY  2,746,759
CHUCK
Filed Jan. 8, 1953

Inventor
Claude J. Kinsey
By Willits, Helmig & Baillio
Attorneys

United States Patent Office 2,746,759
Patented May 22, 1956

2,746,759

CHUCK

Claude J. Kinsey, Detroit, Mich., assignor to General Motors Corporation, Detroit, Mich., a corporation of Delaware Application January 8, 1953, Serial No. 330,229

12 Claims. (Cl. 279—74)

The present invention relates to adjustable chucks and more particularly to chucks for independently gripping a tool or a piece of work material at a plurality of axially displaced points.

The chucks presently employed for holding the shank of a tool or a piece of work material have one set of clamping members or jaws which engage and retain the work material in position. Since these clamping members engage the work material around a common circumference having a restricted area, there is a strong tendency for the work to become axially misaligned and to "wobble." There have been numerous attempts to extend the clamping members axially along a substantial portion of the work material to thereby maintain the work in better axial alignment. This improves the operating qualities of the chucks under ordinary conditions. However, when it is necessary to machine a piece of work material having a shank which is tapered or has portions of substantially different diameters, the chucks heretofore employed are unsatisfactory. Even though the chucks may have elongated clamping members, the members are incapable of engaging the tapered shank along a substantial portion of its length due to the diametric variations thereof. Therefore, in the chucks presently employed a piece of work material having a tapered shank may readily become out of axial alignment. This will prevent accurate machining of the work until the position of the work material in the chuck has been readjusted.

Accordingly, it is proposed to provide a chuck in which a plurality of clamping members engage the work material at axially displaced points and thereby maintain the work material in proper axial alignment at all times. It is further proposed to provide means for actuating all of the clamping members into engagement with the work material by means of a single adjustment.

Figure 1:
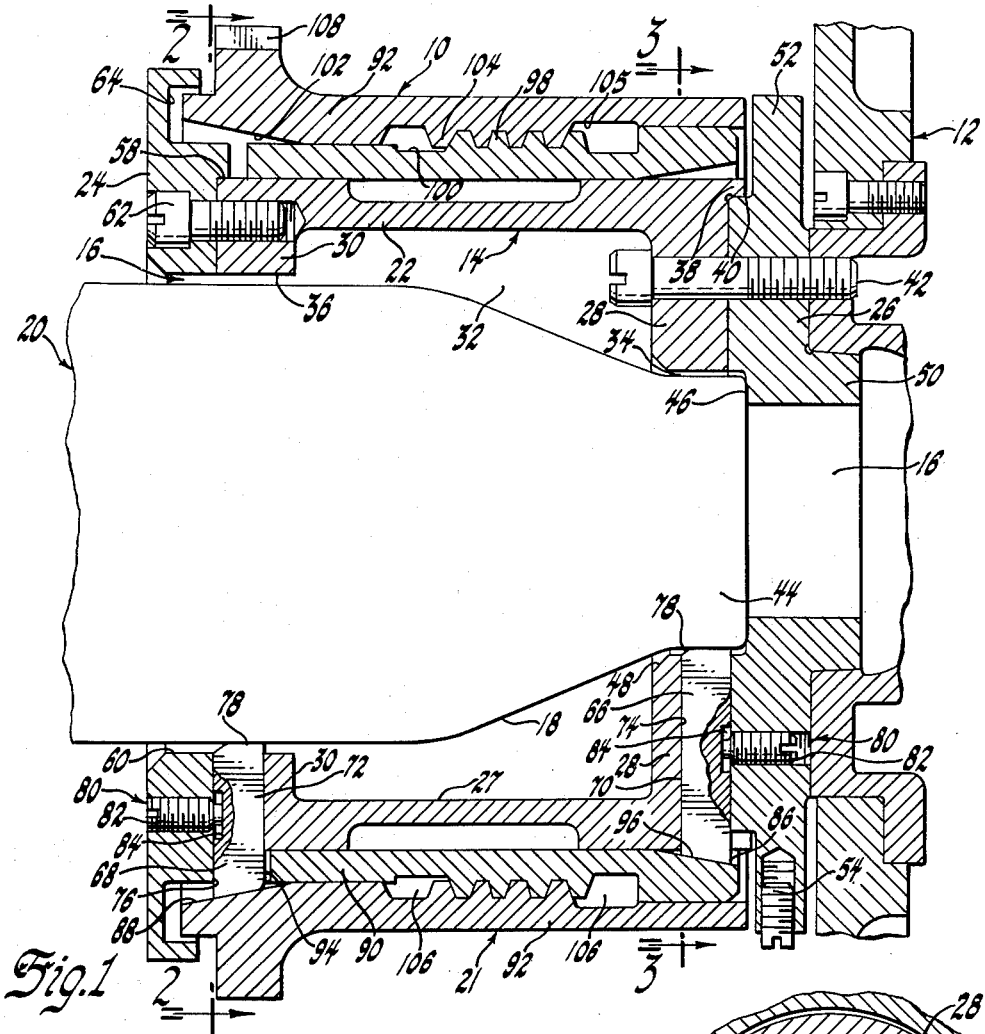
Fig. 1 is a cross-sectional view of a chuck embodying the present invention.
Figure 2:
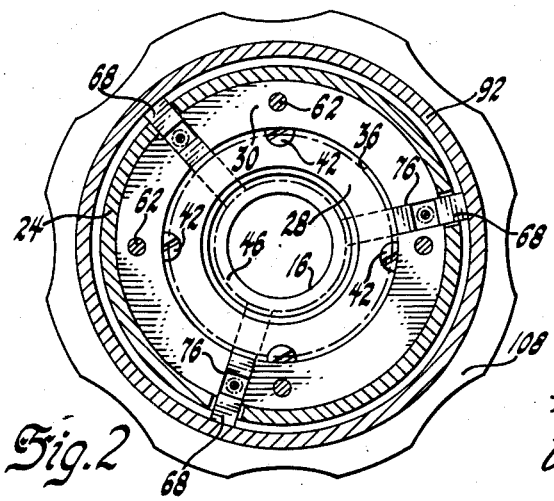
Fig. 2 is a cross-sectional view taken substantially along the plane of line 2—2 of Fig. 1.
Figure 3:
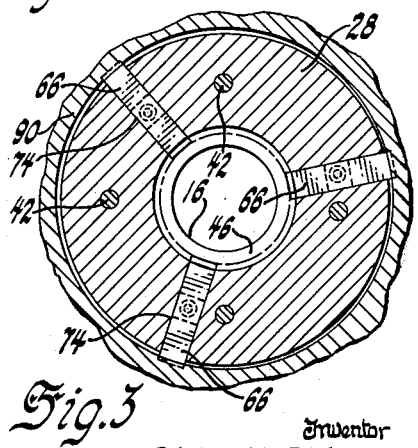
Fig. 3 is a cross-sectional view taken substantially along the plane of line 3—3 of Fig. 1.

Referring to the drawings in more detail, a chuck 10 embodying the present invention is secured to the flanged spindle 12 of a lathe and is adapted to be rotated about an axis extending longitudinally thereof. The chuck 10 has a frame 14 with a passage 16 extending axially inwardly from the opposite ends thereof. The passage 16 is adapted to receive the shank 18 of a tool or of a piece of work material 20 having a generally tapered shape such as the tail of a rocket projectile. When the adjusting means 21 are tightened, the work 20 will be clamped in position.

The frame 14 of the chuck 10 includes a drum shaped member 22 having a ring 24 and a disc 26 secured to the opposite ends thereof. The drum member 22 comprises a cylinder 27 with flanges 28 and 30 adjacent each end thereof. The flanges 28 and 30 which project radially inwardly from each end of the cylinder 27 form a chamber 32. The chamber 32 together with the central openings 34 and 36, which communicate with the chamber 32 form the work receiving passage 16 through the chuck 10. The larger flange 28 is disposed at the inner end of the chuck 10 and abuts the disc 26. A collar 38 extends around the periphery of the flange 28 and cooperatively engages a shoulder 40 formed by the exterior of the disc 26. A plurality of bolts 42 spaced circumferentially about the flange 28 extend through the disc 26 and into the flanged spindle 12 to retain the chuck 10 in position. The opening 34 formed at the center of the larger flange 28 permits the reduced end 44 of the work material 20 to pass therethrough and engage the shoulder 46 formed on the center of the disc 26. If the flange 28 has a beveled edge 48 adjacent to the opening 34 therethrough, it will facilitate placing the work piece 20 in engagement with the shoulder 46.

The disc 26 which forms the inner end of the chuck 10 and is secured to the flanged spindle 12 has a hub 50 projecting from the center thereof. The hub 50 is tapered so as to cooperatively fit into the axial passage through the spindle 12. The disc 26 has a rim 52 which projects radially outwardly therefrom and acts as a stop or retainer for one end of the adjusting means 21. A plurality of screws 54 may be disposed about the periphery of the rim 52 to provide an adjustment to compensate for any unbalanced condition which may arise in the chuck 10.

A ring member 24 may be secured to the smaller flange 30 on the outer end of the drum 22. An annular shoulder 58 formed on one side of the ring 24 may engage the outside of the drum member 22 and thus center the ring 24. This will insure that the ring 24 is positioned so that the aperture 60 therethrough registers with the aperture 36 formed by the smaller flange 30. A plurality of machine screws 62 positioned on the ring 24 threadably engage the smaller flange 30 and retain the ring 24 in position. The outer portion of the ring 24 may be provided with an annular recess 64. The recess 64 receives one end of the adjusting means 21 and acts as a stop for retaining the adjusting means 21 in position on the chuck.

In order to compensate for the variations in the diameter of the work material 20, two separate and independent sets of axially displaced clamp members 66 and 68 are provided. Each set of clamps grip the work 20 at axially displaced points and thereby maintain the work in axial alignment at all times. To provide a self-centering quality, each set of clamps 66 and 68 preferably comprise three individual clamp members. Each of the members are slidably positioned in radial guides 70 and 72 which comprise recessed channels 74 and 76 that extend radially inwardly across each flange. The ring 24 on the disc 26 cooperates with the channels adjacent thereto to enclose the guides 70 and 72. The individual clamps 66 and 68 comprise elongated members having a cross-section similar to the shape of the channels. If the radially inner ends 78 of the clamp members 66 and 68 are beveled, it will be easy to spread them apart when the workpiece is inserted into the chuck 10. It is desirable to provide stop means 80 to prevent the clamp members 66 and 68 from falling out of the guides 70 and 72. This may be accomplished by positioning screws 82 in the ring 24 and disc 26 so that the reduced ends thereof extend into a slot 84 in the side of each of the clamp members 66 and 68. The radially outer ends 86 and 88 of the clamp members 66 and 68 may be shaped to cooperate with the adjusting means 21.

It has been found advantageous to provide separate means for forcing the clamp members 66 and 68 into engagement with the work material 20. Thus it will be possible for both sets of clamps to rigidly engage any objects which may be placed in the chuck 10 irrespective of the diametric variations in the shank 18 of the object. A convenient means of providing such independent movement is to have two separate wedge means, each of which engage one set of clamp members and are actuated by a common expansible means such as a pair of telescoping sleeves 90 and 92.

The sleeves comprise inner and outer sleeves 90 and 92 which are concentrically disposed about the exterior of the drum 22. One end of the inner sleeve 90 may be provided with a plurality of notches 94 while the opposite end thereof may have a beveled surface 96. The notches 94 are circumferentially spaced about the end of the inner sleeve 90 and slidably receive one of the sets of clamp members 68. This prevents the inner sleeve 90 rotating about the drum member 22 but it does not interfere with the sleeve 90 reciprocating axially thereon. The beveled surface 96 on the opposite end of the sleeve 90 is adapted to slidably engage the complementary beveled ends 86 of the clamp members 66. Thus as the inner sleeve 90 slides axially toward the clamp members 66, they will be forced radially inwardly. The exterior of the inner sleeve 90 is provided with a helical thread 98 and has recesses 100 adjacent each end of the thread 98.

The outer sleeve 92 which is concentric with the inner sleeve 90 has formed on one end thereof a beveled section 102 which engages the complementary beveled end 88 of the clamp members 68. The interior of the outer sleeve 92 is provided with a helical thread 104 which cooperates with the thread 98 on the inner sleeve 90. Recesses 105 positioned at each end of the thread 104 cooperate with the recesses 100 on the inner sleeve 90 to form thread receiving chambers 106. Thus as the outer sleeve 92 is rotated, either by hand or by applying a suitable tool to the irregular flange 108 projecting radially outwardly from the outer sleeve 92, the sleeves 90 and 92 will move in axially opposite directions. It will be observed that when the outer sleeve 92 is rotated in the direction required for increasing the distance between the beveled surfaces 96 and 102, the clamp members 66 and 68 will be forced radially inwardly.

To utilize the chuck 10, the work material 20, which may have a generally tapered shank 18, is inserted through the apertures 36 and 60 formed by the smaller flange 30 and the ring 24 respectively until the reduced end 44 thereof abuts the shoulder 46 on the disc 26. When the shank 18 has been inserted as far as it will go, the outer sleeve 92 is rotated either manually or by applying a tool to the irregular flange 108. As the outer sleeve 92 is rotated, the inner and outer sleeves will move in axially opposite directions relative to each other. Thus the sleeves may individually or simultaneously move in axially opposite directions. As the beveled ends 96 and 102 of the sleeves 90 and 92 move across the beveled ends 86 and 88 of the clamp members 66 and 68, a wedging action will take place. This will urge said clamp members radially inwardly. The rotation of the outer sleeve 92 should be continued until both sets of clamp members 66 and 68 have been forced tightly against the work 20 and hold it rigidly in place. If one set of clamp members 66 and 68 engages the work 20 before the other set, the axial movement of the sleeves will continue until the other set of clamping members engage the work material 20. It is thus seen that one simple adjusting operation has simultaneously moved the two separate sets of clamp members into tight engagement with the object at two axially spaced portions even though said portions are of different diameters.

To remove the object 20 from the chuck 10, the outer sleeve 92 is rotated in a direction opposite to the first operation until the beveled portions 96 and 102 are disengaged from the clamp members 66 and 68 thereby releasing the work material 20 from the chuck 10.

While but one embodiment of the present invention is described herein, it will be apparent to those skilled in the art that numerous changes and modifications may be made without departing from the spirit thereof. Accordingly, it is to be understood that the foregoing description is to be considered as being illustrative of the invention and in no way restrictive, and that the invention is to be limited only by the scope of the claims which follow.

What is claimed is:

1. A chuck comprising a member adapted to be rotated about an axis and having a passage extending axially inwardly from one end thereof, axially displaced sets of clamps disposed upon said member, each of said sets including three clamp members projecting radially into said passage, and sleeve means encompassing said member and having bearing surfaces thereon for maintaining them coaxial and including means adapted to vary the amount said clamping members extend into said passage.

2. A chuck comprising a member adapted to be rotated about an axis and having a passage extending axially inwardly from one end thereof, two sets of axially displaced clamps, each of said sets including clamp members movably projecting radially into said passage, axially aligned sleeves encompassing said passage and having axially displaced clamp actuators disposed thereon and engaging each of said sets of clamps, and balanced means adapted to move said actuators into engagement with said clamp members and thereby urge them into said passage with substantially uniform force.

3. A chuck comprising a member adapted to be rotated about an axis and having a passage extending axially inwardly from one end thereof, two sets of axially displaced clamping means, each of said sets including at least three members projecting radially into said passage, and sleeve means coaxially disposed about said member, said sleeves having axially spaced bearing surfaces thereon for maintaining them coaxial, said sleeves engaging each of said clamping members and urging them into said passage.

4. A chuck comprising a member adapted to be rotated about an axis, said member including a passage extending axially inwardly from one end thereof and having axially displaced radial guides thereon, clamp members slidably disposed within said guides and extending into said passage, each of said clamp members having beveled surfaces thereon, telescoping sleeve means slidably disposed on said member and having tapered surfaces thereon complementary to said beveled surfaces, said tapered surfaces engaging said beveled surfaces and urging said clamp members into said passage.

5. A chuck comprising a member adapted to be rotated about an axis, said member having a passage extending axially inwardly from one end thereof, axially displaced guide means on said member, clamp members slidably disposed within said guide means and extending into said passage, each of said clamp members having a beveled surface on the radially outer end thereof, a pair of coaxially aligned sleeves moveably disposed upon said member and having tapered surfaces thereon complementary to said beveled surfaces, said tapered surfaces engaging said beveled surfaces on said clamp members, said sleeves having cooperating expansible means thereon for urging them axially along said member whereby said tapered portions will force said clamp members into said passage.

6. A chuck comprising a member adapted to be rotated about an axis, said member having a passage extending axially inwardly from one end thereof, axially displaced guide means on said member, clamp members slidably disposed within said guide means and extending into said passage, each of said clamp members having beveled surfaces on the radially outer ends thereof, a pair of telescoping sleeves slidably disposed upon said member and threadably engaging each other, and a tapered surface on each of said sleeves complementary to said beveled surfaces, said tapered surfaces engaging said beveled surfaces on said clamp members whereby relative rotation of said sleeves will cause said tapered portions to urge said clamp members into said passage with substantially uniform forces.

7. A chuck for holding a workpiece comprising a member adapted to be rotated about an axis, and having a passage extending axially inwardly from one end thereof, axially displaced guide means on said member, a plurality of radial keys positioned in said guide means so as to extend radially into said passage, the radially inner ends of each of said keys being adapted to engage said workpiece, the radially outer ends of said keys having beveled surfaces thereon, a pair of telescoping sleeves slidably disposed upon said member, each of said sleeves having threaded portions thereon adapted to cooperatively engage each other, means for rotating said sleeves relative to each other, and a wedge on the ends of each of said sleeves adapted to engage said beveled surfaces on said keys whereby rotation of said sleeves relative to each other will cause said keys to be urged into said passage.

8. A chuck for holding a workpiece comprising a member adapted to be rotated about an axis and having a passage extending axially inwardly from one end thereof, two sets of axially displaced guide means on said member, each of said sets including three circumferentially spaced radial guides, a radial key positioned in each of said guides so as to extend radially into said passage, the radially inner ends of each of said keys being adapted to engage said workpiece, the radially outer ends of said keys having beveled surfaces thereon, a pair of telescoping sleeves slidably disposed upon said member, each of said sleeves having threaded portions thereon adapted to cooperatively engage each other, means for rotating said sleeves relative to each other, and wedge means on the ends of said sleeves, said wedge means being substantially complementary to said beveled surfaces for engaging said surfaces whereby rotation of said sleeves relative to each other will cause said keys to be urged into said passage.

9. A chuck for holding a workpiece comprising a member adapted to be rotated about an axis and having a passage extending axially inwardly from one end thereof, two sets of axially displaced guide means on said member, each of said sets including three circumferentially spaced radial guides, a key positioned in each of said guides so as to have the radially inner end thereof extend radially into said passage for engaging said workpiece, the radially outer ends of each of said keys having beveled surfaces thereon, stops extending into said guides for projecting into recesses in said keys to limit the amount of radial movement thereof, a pair of telescoping sleeves slidably disposed upon said member, each of said sleeves having threaded portions thereon adapted to cooperatively engage each other, means for rotating said sleeves relative to each other, wedge means on the ends of said sleeves, said wedge means being complementary to said beveled surfaces for engaging said beveled surfaces on said keys whereby rotation of said sleeves relative to each other will cause said keys to be urged into said passage.

10. A chuck comprising a member adapted to be rotated about an axis, said member having a passage extending axially inwardly from one end thereof, two sets of axially displaced guide means on said member, each of said means including a plurality of circumferentially spaced radial guides, a radial key slidably disposed in each of said guides with the inner ends thereof projecting into said passage, a pair of telescoping sleeves slidably disposed upon said member and threadably engaging each other, one of said sleeves having notches registering with the guides in at least one set for receiving the outer ends of the keys in said set, and tapered surfaces on each of said sleeves engaging said keys whereby relative rotation of said sleeves will cause said tapered portions to urge said keys into said passage with substantially uniform forces.

11. A chuck for holding a workpiece with an axially tapering shank having portions thereon with substantially different diameters, said chuck comprising a member adapted to be rotated about an axis and having a passage extending axially inwardly from one end thereof for receiving said shank, two axially displaced sets of radial guides, a key slidably disposed in each of said guides to form two axially spaced sets of radial keys, the radially inner ends of the keys in each set being adapted to engage said workpiece along axially different portions having substantially different diameters, and sleeve means encompassing said member and having means thereon for forcing said keys radially inwardly and positioning the radially inner ends of the keys in each set at different diameters.

12. A chuck for holding a workpiece with an axially tapering shank having portions thereon with substantially different diameters, said chuck comprising a member adapted to be rotated about an axis and having a passage extending axially inwardly from one end thereof for receiving said shank, two axially displaced sets of radial guides, a key slidably disposed in each of said guides to form two axially spaced sets of radial keys, the radially inner ends of the keys in each set being adapted to engage said workpiece along axially different portions having substantially different diameters, and a pair of telescoping sleeves encompassing said member and having bearing means thereon for maintaining said sleeves coaxial, and means for simultaneously forcing said sleeves in axially opposite directions, each of said sleeves having wedge means thereon engaging the keys in each set and urging them radially inwardly into said passage when said sleeves are moved in axially opposite directions.

References Cited in the file of this patent

UNITED STATES PATENTS

| | | |
|---|---|---|
| 808,257 | Reed | Dec. 26, 1905 |
| 1,400,306 | Miller | Dec. 13, 1921 |

FOREIGN PATENTS

| | | |
|---|---|---|
| 813,475 | Germany | 1951 |